(12) United States Patent
Manns et al.

(10) Patent No.: US 10,682,587 B2
(45) Date of Patent: Jun. 16, 2020

(54) FUEL DEHYDRATION SYSTEM AND METHOD

(71) Applicants: Darren Grant Manns, Sarnia (CA); Daniel Weeden, Toronto (CA)

(72) Inventors: Darren Grant Manns, Sarnia (CA); Daniel Weeden, Toronto (CA)

(*) Notice: Subject to any disclaimer, the term of this patent is extended or adjusted under 35 U.S.C. 154(b) by 0 days.

(21) Appl. No.: 16/142,772

(22) Filed: Sep. 26, 2018

(65) Prior Publication Data

US 2019/0091599 A1    Mar. 28, 2019

Related U.S. Application Data

(60) Provisional application No. 62/563,125, filed on Sep. 26, 2017.

(51) Int. Cl.
| | |
|---|---|
| *B01D 3/10* | (2006.01) |
| *B01D 17/04* | (2006.01) |
| *C10L 1/02* | (2006.01) |
| *C10G 33/06* | (2006.01) |
| *C10G 53/02* | (2006.01) |

(52) U.S. Cl.
CPC ............. *B01D 3/10* (2013.01); *B01D 17/044* (2013.01); *B01D 17/045* (2013.01); *C10G 33/06* (2013.01); *C10G 53/02* (2013.01); *C10L 1/026* (2013.01); *C10L 2200/0476* (2013.01); *C10L 2270/026* (2013.01); *C10L 2290/08* (2013.01)

(58) Field of Classification Search
CPC .......... B01D 3/18; B01D 1/0035; B01D 1/26; C02F 1/043; C02F 1/10; C02F 1/14
See application file for complete search history.

(56) References Cited

U.S. PATENT DOCUMENTS

| | | | |
|---|---|---|---|
| 2012/0228116 A1* | 9/2012 | Presutti ................. | B01D 1/065 203/4 |
| 2016/0209124 A1* | 7/2016 | Da Silvaa .............. | C09K 5/063 |
| 2017/0241702 A1* | 8/2017 | Klett ....................... | F25D 31/00 |

\* cited by examiner

*Primary Examiner* — Brian A McCaig
(74) *Attorney, Agent, or Firm* — DLA Piper LLP (US)

(57) ABSTRACT

A system for removing moisture from a hydrocarbon-based fluid is described. The system comprises a sealable and vacuum rated chamber disposed within a separator vessel. An open cell reticulated foam media is packed inside the chamber. The hydrocarbon-based fluid may fill the vacuum rated chamber. A vacuum may be applied to the chamber causing undesirable moisture in the fluid to boil under differential vacuum. The reticulated foam media increases the efficacy of the boiling process. Described also is a method for dehydrating a hydrocarbon-based fluid.

15 Claims, 7 Drawing Sheets

FUEL DEHYDRATION SYSTEM AND METHOD

CROSS-REFERENCE TO RELATED APPLICATIONS

This application claims the benefit of U.S. Provisional Application No. 62/563,125, filed Sep. 26, 2017, which is incorporated herein by reference in its entirely.

TECHNICAL FIELD

The present disclosure generally relates to removing moisture from hydrocarbon-based fluids. More specifically, provided is a fuel dehydration system and method for removing moisture from fuels, such as biodiesels.

BACKGROUND

Undesirable moisture, particularly in fuels such as diesels and biodiesels, continues to be a widespread issue in the fuel industry. Moisture can cause many problems in fuel-dependent operations, including inducing corrosion, accelerating fuel breakdown and oxidation speed, and reducing the lifespan of equipment that burns the fuel.

Governments and corporations are pushing for a greater percentage of liquid fuels to be manufactured from non-fossil fuel based feedstocks to take advantage of lessened carbon and nitrogen oxide emissions that are associated with such fuels. Fuel feedstocks may also be grown "in-country", which mitigates a country's reliance on foreign oil deposits to meet national fuel demands and enables better control over pricing.

However, bio-based fuels are substantially more susceptible to hygroscopic absorption of moisture than traditional hydrocarbon-based fuels, resulting in an increased amount of moisture absorbed and stored in the bio-fuel. The moisture that accumulates is particularly problematic as it cultivates the growth and proliferation of undesirable bacteria, yeast, fungi, and mould in the fuel. These organisms, in conjunction with the elevated moisture levels, can cause common corrosion, microbially induced corrosion, elevated acidity levels in-fuel and in-tank, reduction of lubricity, and accelerated fuel breakdown, all of which also reduce the operating lifespan of the equipment utilizing the fuel.

High moisture levels in diesel fuels may further cause mechanical injector failure in engines as moisture present in the fuel expands at a higher rate than the fuel it is being carried with when both are introduced into the high heat of a combustion chamber. Moisture in the combustion chamber turns to steam, expands rapidly, and may cause damage to the injector tips, or parts thereof, leading to injector failure, rough engine idling, reduced engine performance, reduced fuel economy, and, in extreme conditions, may even flood the combustion chamber with fuel causing possible catastrophic detonation.

A number of methods have been proposed in the fuel processing, handling, shipping, storage and management industries to remove or separate moisture from fuels. The methods that have been proposed include filtration with a coalescing or absorptive style media, centrifugal separation by molecular weight, temperature increase separation, temperature decrease separation, and aeration with associated dehydration.

The methods of moisture removal or separation that have hereto been proposed are expensive, time consuming, and inefficient. For example, methods of removing moisture from fuel that include excessive heating of the fuel can lead to oxidation, which causes breakdown of the fuel, induces precipitate formation, causes fuel/fluid chemical instability, and decreases the lifespan of the fuel. Further, heating a fuel causes it to "off-gas" near its regular flash point (many diesel fuels have a flashpoint near 52 degrees Celsius and almost all have a flashpoint lower than 60 degrees Celsius, unless they have been mixed, for example, as bunker fuel for ships), which makes the atmosphere around the fuel prone to combustion. As another example, methods that utilize freezing often keep the fuel cloudy after it is returned to room temperature as it is difficult to obtain a moisture level that is below 200 ppm with such a process. In general, methods that can be performed at room temperature are preferred as they avoid the above noted problems.

As a further example, coalescing, "stripping" or "wicking" style filtration media, and certain centrifuge water separation technologies, work on the basis of water droplet size and surface tension differentials. These methods often become ineffective as moisture is absorbed into bio-fuels and the mixture becomes a true solution, or for a chemically bonded emulsion. As the differential surface tension between the moisture and the fuel is reduced, moisture can no longer be "detected" by the coalescing media as distinct and separate from the fuel and passes through the filtration technology along with the fuel. Few of the proposed methods of fuel dehydration can remove absorbed or long term finely emulsified and chemically bonded water from fuels, oils or other hydrocarbon-based fuels and none can do so in an efficient and cost effective manner.

What is required is a new and efficient method of dehydrating fuel, specifically bio-diesel, that mitigates the drawbacks of current dehydrating technologies.

SUMMARY

In one embodiment, provided is a dehydration system for removing moisture from a fluid, comprising a separator vessel that itself comprises a body, a vacuum-rated chamber located within the body, a sealable vacuum intake port on the body, wherein the sealable vacuum intake port connects the body to the vacuum-rated chamber, a sealable fluid intake port on the body, wherein the fluid intake port connects the body to the vacuum-rated chamber, an open-cell reticulated foam medium, wherein the open-cell reticulated foam medium is disposed within the vacuum-rated chamber; and, a vacuum pump connected to the sealable vacuum intake port by way of a vacuum-rated conduit.

In a further embodiment, the vacuum pump may be used to create a vacuum between 26 inHg and 30 inHg in the vacuum-rated chamber. In another embodiment it may be used to create a vacuum between 29 inHg and 30 inHg in the vacuum-rated chamber. In another embodiment, the vacuum pump may be used to create a vacuum between 29.92 inHg and 30 inHg the vacuum-rated chamber.

In a further embodiment, a retaining mechanism is affixed to the inner wall of the vacuum-rated chamber for retaining the open-cell reticulated foam medium and preventing the open-cell reticulated foam medium from migrating up the vacuum-rated chamber.

In a further embodiment, at least one filter is attached to the fluid intake port on the body to clear intake fluid of particulate matter.

In a further embodiment a vacuum-rated condensing vessel capable of collecting excess moisture is disposed in the vacuum-rated conduit connecting the vacuum pump and the vacuum-rated chamber. In an further embodiment, the vacuum-rated condensing vessel is cooled to increase its moisture condensing efficacy.

In a further embodiment the separator vessel further comprises a removable and sealable lid comprising in part a vacuum-rated clear material, the clear material allowing for an operator to see through the lid and see inside the vacuum-rated chamber.

In a further embodiment a method of removing moisture from a fluid is provided, comprising providing the fluid to a vacuum-rated chamber containing a reticulated foam medium within the vacuum-rated chamber; sealing the vacuum-rated chamber; engaging a vacuum pump to produce a vacuum in the vacuum-rated chamber thereby causing moisture in the fuel to boil under pressure; removing vaporized moisture from the vacuum-rated chamber until the fuel reaches a required level of dehydration; removing the fluid from the vacuum-rated chamber.

In a further embodiment of the method of removing moisture from a fluid, the vacuum pump is engaged to create a vacuum between 26 inHg and 30 inHg in the vacuum-rated chamber. In a further embodiment, the vacuum pump is engaged to create a vacuum of between 29 inHg and 30 inHg in the vacuum-rated chamber. In a further embodiment, the vacuum pump is engaged to create a vacuum between 29.92 inHg and 30 inHg in the vacuum-rated chamber.

In a further embodiment, an amine solution is added to the fluid prior to engaging the vacuum pump.

In a further embodiment, the required level of dehydration is below 150 ppm of water. In a further embodiment, the required level of dehydration is below 100 ppm of water. In a further embodiment, the required level of dehydration is below 50 ppm of water.

In another embodiment, an open-cell reticulated foam medium for use in a fluid dehydration process is provided wherein the open-cell reticulated foam medium is placed within a vacuum-rated chamber of a separator vessel; fluid to be dehydrated is added into the vacuum-rated chamber, submerging the open-cell reticulated foam medium; a vacuum is produced within the vacuum-rated chamber; and the open-cell reticulated foam medium increases the surface area of the fluid and thereby allows moisture within the fluid to boil-off at room temperature as the vacuum is produced.

In another embodiment, a vacuum truck is provided comprising a truck body; a vacuum-rated tank disposed on the truck body; an open-cell reticulated foam medium retained in the bottom of the vacuum-rated tank; a vacuum pump affixed to the truck body capable of producing a vacuum within the vacuum-rated tank.

In a further embodiment, open-cell reticulated foam medium in the vacuum truck is contained within a hydrocarbon-resistant casing that is affixed to the bottom of the vacuum-rated tank.

BRIEF DESCRIPTION OF THE DRAWINGS

There is shown in the drawings, by way of example only, embodiments of the present disclosure, in which like reference numerals describe similar items throughout the various figures.

DETAILED DESCRIPTION

A detailed description of the embodiments of the current disclosure will be given in the following. It will be appreciated that the figures provided herein are for illustration only and are not meant to be restrictive. Any references to directions, such as "up" or "down", "top" or "bottom", are exemplary and refer only to the directions shown in the figures.

Generally, a fuel that has a moisture level or water level that is above 200 ppm must be "dried" prior to use. Particularly, all diesel fuels must be "clear and bright" and free from water droplets to pass the ASTM D4176 fuel test for clarity and cleanliness. ASTM D4176 is the minimum standard that a fuel must adhere to in order to be used in a modern diesel engine. A fuel that is cloudy at temperatures above freezing with a moisture or water level slightly above 200 ppm may pass an ASTM D4176 test, depending on the temperature, but would generally be out of warrantee and would not adhere to the Worldwide Fuel Charter. As such, the goal for most diesel dehydration is to obtain a fuel with a water moisture content below 200 ppm.

The present disclosure provides a fuel dehydration system, and a fuel dehydration method, both of which may be adapted and scaled to meet the requirements of a particular application. The method and system described provide an efficient way by which fuel may be dried so that it is "clear and bright" and passes, for example, the ASTM D4176 test.

The system and method of the present disclosure will be described in the context of fuel dehydration; however, it should be understood that the system and method may be applied in other fluid dehydration settings. More specifically, the system and method described herein may equally be applied to remove moisture from mineral oils, motor oils, lubricating and other oils, as well as hydraulic and high pressure fluids.

Figures 2, 3:
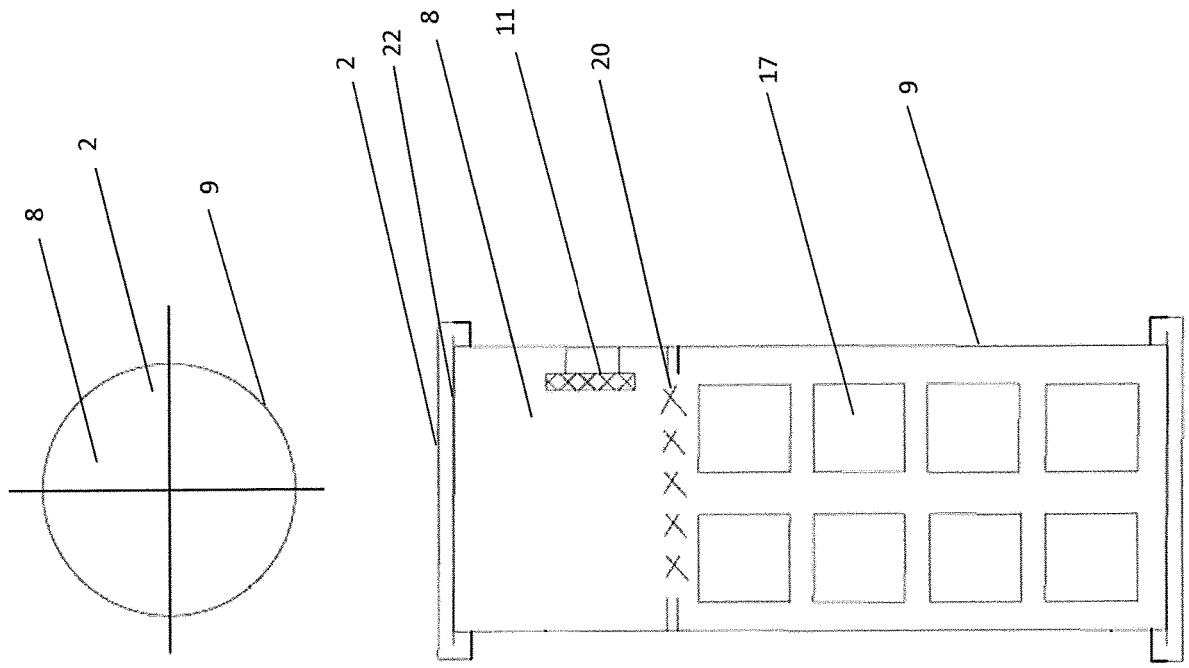
FIG. 2 is a top view of a separator vessel of the present disclosure.
FIG. 3 is a front plan view of a separator vessel of the present disclosure.

FIG. 2 is a schematic view of the top of a separator vessel 9 of one embodiment of the present disclosure. FIG. 3 is a plan view of the front of the same separator vessel 9. Disposed within the separator vessel 9 is a sealable vacuum-rated chamber 8. The size of the chamber 8, and the separator vessel 9, may be readily scaled to meet specific job requirements. The size of the chamber 8 and separator vessel 9 may be increased without impacting the effectiveness of the system and method of the current disclosure.

An open cell reticulated foam media 17 is packed inside the chamber 8. The foam media 17 may be both fuel and oil/fuel resistant. More specifically, the foam material may be "resistant" to fuel related accelerated breakdown. If the material is not fuel/oil compatible or resistant it may eventually dissolve or soften substantially while submerged in the fuel. The foam media 17 may be made out of any hydrocarbon-compatible reticulated foam media, such as polyester, polypropylene or polyurethane or other fuel resistant chemicals.

A reticulated foam is a very porous, low density, solid foam. Reticulated is generally understood to mean that the foam is shaped much like a net. Reticulated foams are extremely open foams—i.e. there are few, if any, intact bubbles or cell windows. This is allows the fuel to flow unobstructed through the foam as it applies to the vessel filling, liquid maldistribution under vacuum and the vessel fuel extraction.

Although varying amounts of open cells per inch for the foam media 17 may be utilized, in a preferred embodiment, a foam media 17 with a high pores-per-inch count may be used. A foam media with a high pores-per-inch count may provide a greater surface lattice for water molecules in the fuel to collect on. The more water molecules that collect on the lattice of the foam, the faster the resulting dehydration process may be. In a further preferred embodiment, a foam media 17 with a pores-per-inch count in the range of 8 to 34 may be used.

The foam 17 is also "quenched". Many reticulated foams begin as closed cell foams and the quenching process is utilized to dissolve membranes between the foam's cells after its construction to open the cells. Quenching reticulated foam involves running a loaf of foam through a caustic bath at a controlled temperature, concentration and duration. The caustic solution attacks and dissolves the window membranes, leaving only the skeletal structure and open cells. Alternatively, the foam loaf may be filled with gas and lit of fire to remove the cell membranes.

A quenched reticulated foam may be used in the vacuum dehydration process as this foam may have a rougher or more etched cell strand, which may provide a very efficient surface tension due to its a greater surface area that allows for water molecules to adhere to under vacuum. Quenched reticulated foam may also have the necessary properties to resist deforming under ultimate vacuum. Quenched reticulated foam may also be shaped to fit any vessel dimension. The free flowing characteristics of quenched reticulated foam may allow water vapors to rise to the top of the vacuum vessel and exit freely. Compressing quenched reticulated foam has minimal effect on its flow characteristics. Quenched reticulated foam has minimal effect on tank capacity as its volume may only be about 6% of tank volume based on liquid measure. This minimal volume of foam may contribute to the overall efficiency of the process by maximising the tank capacity.

As shown in FIG. 2, in a further preferred embodiment, the reticulated foam media 17 may be packed to a height of two-thirds of the chamber 8. The foam media 17 may be retained in position by way of a retaining mechanism 20. The retaining mechanism 20 may be a light screen or a mesh that may be affixed to the interior walls of the chamber 8 by way of epoxy, solder, weld bead at the edges, or by any other suitable method. The retaining mechanism 20 may prevent the foam media 17 from migrating up the chamber 8 while the system is operating and moisture leaving the fuel migrates up the chamber.

Figure 1:
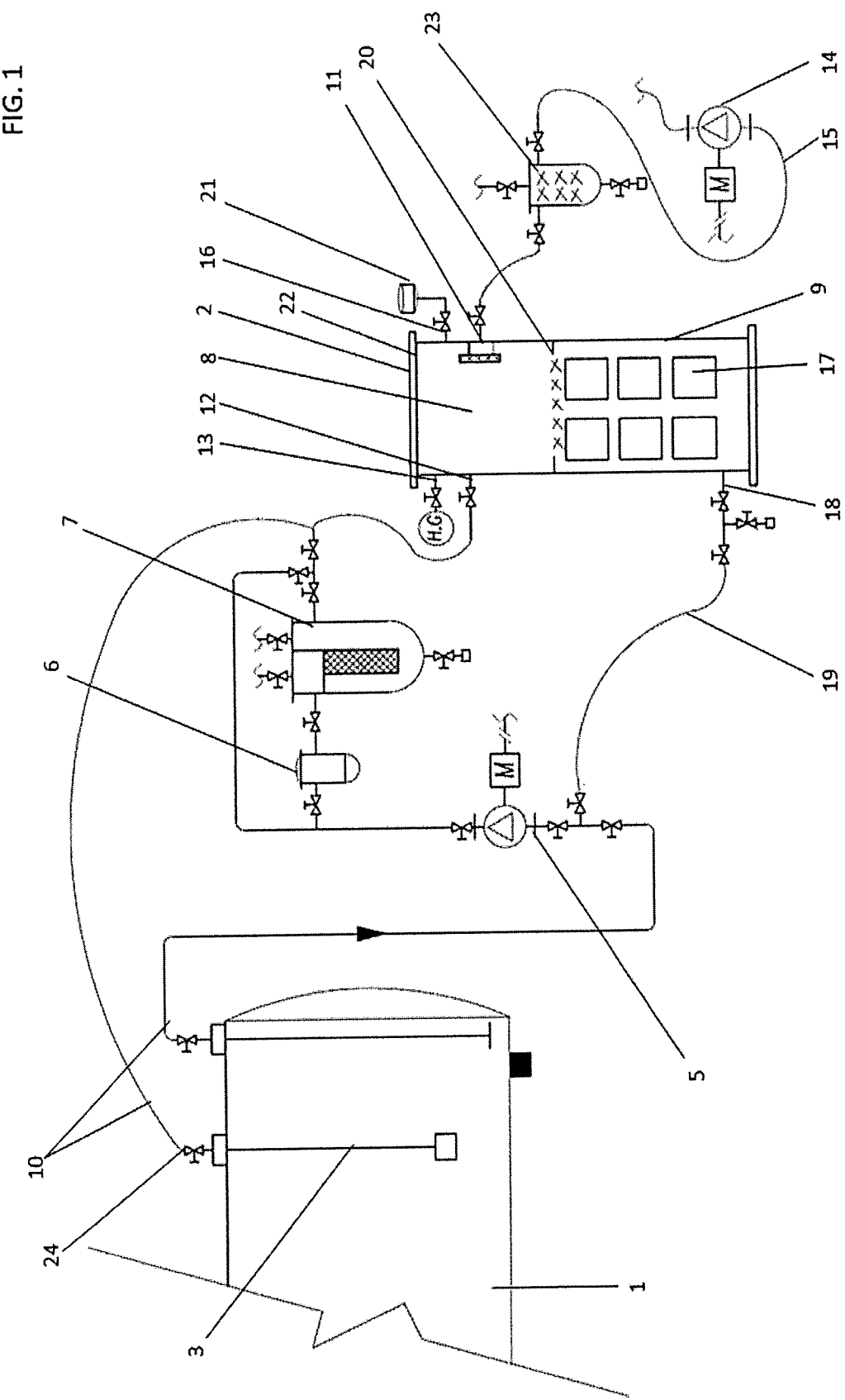
FIG. 1 is a schematic view of one embodiment of a fuel dehydration system of the present disclosure.

As can be seen in FIG. 1, in one embodiment of the present disclosure, chamber 8 may include a means for receiving fuel from a fuel storage tank 1. A sealable port 12 with an intake fitting may be included in the top of the separator vessel 9, which allows for at least one tank hose 10 with a corresponding fitting to be attached to the separator vessel 9. Exemplary fittings that may be used include matching camlock-style fittings. At least one tank suction tube 3 may be used to pull fluid from the tank 1. The at least one suction tube 3 may be in fluid communication with the fuel in the tank and with the at least one tank hose 10. The at least one tank hose 10 may facilitate movement of fuel from the tank 1 to the chamber 8 of the separator vessel 9 after the fuel has been suctioned from the tank by way of the at least one suction tube 3.

In a preferred embodiment of the disclosure, a filter 7, or multiple filters, may be attached to the fuel carrying tank hose 10 so that the fuel may be cleared of particulate matter, such as rust, debris, bacteria, or sludge, before it enters the separator vessel 9 and chamber 8. The filter 7, or multiple filers, may be of use in the dehydration of highly contaminated fuels that have high or very high ISO particulate levels. This additional filtering step minimizes the amount of particulate matter entering the chamber 8 and clogging or obstructing the open cell or open pore design of the foam media 17, keeping the foam media 17 free of debris. Foam media 17 that is partially or wholly plugged may no longer facilitate the migration of moisture up the chamber 8, thereby limiting the efficacy of the system. In a further embodiment, a sight glass 6 may be attached to the fuel carrying tank hose 10 to observe and regulate the amount of fluid in the filter 7.

In one embodiment of the present disclosure the separator vessel 9 may further comprise a second sealable port 13 at its top side, which may act as a vent to keep the chamber 8 from becoming over-pressurized during operation. Sealable ports 12, 13 may be sealable to vacuum, and preferably may be sealable to a vacuum of 29.92 inHg. The ports 12, 13 may be sealed using a valve, such as an isolation valve 24 or upward facing ball valve.

In an alternative embodiment of the present disclosure, the separator vessel 9 may include a sealable valve port 16 located at or near its top side. In such an embodiment, fuel may be poured into the chamber 8 of the separator vessel 9 through the sealable valve port 16 using a funnel 21, instead of being pumped through a hose 10. One exemplary type of valve that may be used in this embodiment is an isolation valve 24.

In one embodiment of the present disclosure, the chamber 8 may include a sealable port 18 at the bottom of the chamber 8. The port 18 provides a location from which dried or dehydrated fuel may be removed at the completion of the dehydration process. The port 18 can be sealed using a valve, such as a ball, gate or isolation valve 24. Further, the valve that may be used may include a fitting that enables a hose 19 with a corresponding fitting to be attached to the port 18. Once the process is complete, the dehydrated fuel may be carried out of the chamber 8 using the port 18 and attached hose 19.

In an alternative embodiment of the disclosure, a drop tube (not shown) may be used instead of port 18. The drop tube may run from the top of the chamber 8 through a vacuum sealable opening, to the bottom of the chamber 8, allowing dehydrated fuel to be pumped out of the top of the chamber 8 using any known pump mechanism.

In a further embodiment, the separator vessel 9 may comprise a removable and sealable lid 2 and bottom plate 22. The removable lid 2 may allow for easier packing of foam media 17 into the chamber 8. The lid 2 may be clear and "see-through" so that the dehydration process may be observed by an operator. Observation of the process may allow the operator to more accurately determine when the process has been completed. The lid 2 may be made of acrylic, as an example. The bottom plate 22 does not have to be clear in its entirety but does need to facilitate removal of the sealable lid 2. The removable lid 2 may also help facilitate cleaning or repacking of the foam if the foam is removed. In one embodiment, the removable lid 2 and bottom plate 22 may be connected to the separator vessel 9 with flange coupling, using a top flange and a bottom flange. In another embodiment, the bottom plate 22 may be bolted onto the top of the separator vessel 9 or affixed in any removable manner.

The separator vessel 9 may be connected to a vacuum pump 14, which may be used to create a vacuum in the chamber 8. The vacuum pump 14 may be fed using a 110V or 230V power supply, for example. The separator vessel 9 may include a vacuum pump intake port 11 near the top of the separator vessel 9. The vacuum pump 14 may be connected to the port 11 using a vacuum-rated device 15, such as a pipe or hose. The vacuum-rated device 15 and port 11 may be connected using corresponding fittings, for example, camlock-style fittings may be used. The flow of the port 11 may be controlled using an valve, such as an isolation valve 24. Once the vacuum pump 14 is in communication with the intake port 11, it may be used to remove atmosphere from the chamber 8, putting the chamber 8 under vacuum.

In one embodiment of the present disclosure, the vacuum pump 14 may be used to create at least 26 inHg of vacuum in the chamber 8. Preferably, the vacuum pump 14 may be used to create a vacuum of 29 inHg in the chamber 8. More preferably, the vacuum pump 14 may be used to create a vacuum of 29.92 inHg in the chamber 8. Generally, the more vacuum that may be created in the chamber 8, the faster the dehydration process.

In operation, fuel that is to be dehydrated (known as "wet" fuel, or fuel that has a moisture level over 200 ppm) is provided to the chamber 8 by way of hose 10 or by way of a funnel 21. The fuel may be filtered prior to entering the chamber 8 by a filter, or series of filters 7, which clear it of particulate matter, as described above, if the fuel is particularly contaminated. Chamber 8 may be filled with fuel up to the top of the foam media 17 that is installed therein.

Once fuel has filled the chamber 8 up to the top of the foam media 17 or thereabouts, which in a preferred embodiment is up to two-thirds of the total height of the chamber, all ports of the separator vessel 9 are closed and camlock plugs or caps are applied to fittings threaded into the ball valves at the outside ends. The separator vessel 9 is thus sealed so that a vacuum may be introduced without leakage occurring at any opening or slow ball valve. Any such leakage could lessen the efficacy of the process and slow the process by allowing a reduction in optimum vacuum buildup.

Filling the chamber 8 with fuel only up to two-thirds of its total height accounts for expansion that will occur in the moisture and in the fuel once the chamber 8 is under full vacuum and the moisture begins to expand before while boiling. Fuel usually expands approximately twenty percent once under full vacuum. The fuel may be filled so that it is just visible to an operator above the top of the foam media 17, which is installed in the chamber 8.

Once the chamber 8 is filled with fuel, the vacuum pump 14 may be engaged to produce a vacuum in the chamber 8. At this stage, the only opening in the separator vessel 9 and chamber 8 is that through which the vacuum pump 14 is drawing atmosphere out of the chamber 8. All other ports and lids are closed to vacuum seal.

In a further embodiment of the present disclosure, atmosphere that is vacuumed out of the chamber 8 may be pulled through a vacuum rated condensing vessel 23. The vacuum rated condensing vessel 23 is attached to the vacuum chamber 8 via vacuum rated hose or pipe and is located between the vacuum pump 14 and the vacuum chamber 8. The vacuum pump 14 pulls air from the main vacuum chamber 8 through the condensing vessel 23 to create a place for excess moisture to accumulate on the way to the vacuum pump. A valve, for example a ball valve, may be located at the bottom of the condensing vessel 23 and may be opened between fuel batches so that excess accumulated water can readily and easily removed and need not be introduced into the vacuum pump 14. The condensing vessel 23 may also act as an initial capture vessel in case any excess fuel volume expansion, particularly in excessively "wet" batches of fuel or fluid, causes the fuel or fluid to reach the height of the vacuum pump intake port 11 and causes it to be pulled along the vacuum-rated device 15 towards the vacuum pump 14, reducing the effectiveness of the vacuum pump and ruining its internal pump lubricating fluid. The condensing vessel 23 may further act as a safety catch in the dehydration process, allowing the operator to drain out any accidental fluid intake through the vacuum pump intake port 11 and the vacuum-rated device 15. The condensing vessel 23 may be at an easier location to service and may be used to avoid having to change out any vacuum pump 14 lubricating fluid that could have been ruined as a result of an accidental ingress of fuel into the pump 14.

In a further embodiment, the condensing vessel 23 may be cooled, from room temperature down to near frozen, to increase its moisture condensing efficacy as moist gas moves through it on the way to the vacuum pump 14 and its eventual atmospheric discharge. Cooling of the condensing vessel 23 may be accomplished by utilizing cubed ice or a slurry of ice and water, or the condensing vessel 23 may be cooled via a fluid filled cooling hose wrapped around the exterior surface of the vessel.

When vacuum in the chamber 8 reaches a range of 25 inHg to 26 inHg (approximately 100 Torr, depending on the temperature), a "bubbling" effect may be seen beginning to take place in the fuel and the fuel volume begins to expand. Once a boiling state is achieved in the fuel, as pressure is reduced and vacuum is increased, vaporization of moisture in the diesel begins and space and turbulence are created in the fuel column as the moisture expands from a liquid to a gaseous form. The gaseous form of the moisture in the fuel increases the fluid volume in the chamber 8 as it expands and migrates from its location in the lattice of the foam media 17 to the surface of the foam media 17. The moisture then enters an open vapour space above the fuel column and may be removed through the port 11 going to the vacuum pump 14.

As the vacuum pump 14 draws out more atmosphere from the chamber 8, the air is vented by the vacuum pump 14 through the pump's exhaust port in to the room housing the separator vessel 9 or subsequently through a hose connecting the exhaust port to the exterior of the building housing the system. As the process continues, the vacuum inside the chamber 8 reaches 29.92 inHg, or near "ultimate" vacuum (measured as 30 inHg). A vacuum gauge may be plumbed into the top side of the separator vessel 9 to allow an operator to measure the vacuum. At a vacuum of 29.92 inHg, the fuel inside the chamber 8 may hit its maximum boiling point and the reticulated foam media 17 acts to amplify the "bubbling" process by providing the moisture in the fuel with a surface, or lattice, to accumulate on and attach to before boiling or bursting and vaporizing. Once vaporized, the moisture, now present in a gaseous state, will make its way to the top of the chamber 8 to be removed as a gas through the only open port of the vacuum chamber 8, which is connected via the vacuum rated device 15 to the vacuum pump 14, as stated above.

The foam media 17 and the application of a vacuum allow the moisture trapped in the fuel to "boil off" at a lower temperature than would otherwise be the case. For example, the moisture may be "boiled off" at room temperature, or very close to room temperature.

As more of the moisture is removed from the hydrocarbon fuel (the moisture being carried away largely in its gaseous state) the vacuum pump 14 continues running and removing the moisture and maintaining the vacuum level in the vacuum chamber 8 to near ultimate vacuum to complete the process and to allow for continued removal of the last of the moisture in the hydrocarbon fluid.

As the amount of moisture in the fuel reaches a sub-100 ppm level, or preferably a sub-50 ppm level, the bubbling and boiling in the fluid column is lessened substantially but some bubbles and "hiccups" of moisture, in its gaseous state, may continue to escape from the fuel and up through the foam media 17, until the fluid column is still and the dehydration process is complete on that batch of fuel.

The contraction and lowered level of the fuel back to, or below, the original starting point height wise at the top of the foam media 17, still under vacuum, provides the operator with an indication as to when the batch of fuel reaches a desired low moisture content. In a further embodiment, a "moisture meter" threaded into a fitting at the top side area of the chamber 8 (at similar height as the upper intake and exhaust valves) may be used to measure humidity levels in the vapour space and may be used to monitored and calculate when the air above the fuel is dried to a desired level. The process may achieve a moisture level of 50 ppm.

Batches of diesel and bio-diesel that originally containing between 800 ppm and 1200 ppm of moisture were tested using the system described above. The process described herein lowered moisture levels of these tested fuels to between 150 ppm and 50 ppm in 4 to 20 minutes.

Once the process of dehydration is complete, the valves of the separator vessel 9 may be opened and room atmosphere may be introduced to the chamber 8. The dehydrated fuel may then be pumped out through the opening 18 at the bottom side of the chamber 8 into a clean container barrel or clean tank so that the next batch of fuel can be introduced to the chamber 8 through the same process as outlined above.

In a further embodiment of the present disclosure, temperature may be elevated in the vacuum chamber 8 to increase the speed and efficacy of the dehydration process. As the temperature increases in the chamber 8, the amount of vacuum needed to begin the "boiling" process that releases the moisture into the vapour space above the fluid in the chamber 8 is reduced. A heating mechanism can be implemented around the external surface of the chamber 8. The heating mechanism can be a warming plate, heating coil or heating tube, for example.

In a further embodiment of the present disclosure the fuel may undergo a chemical amine treatment prior to or during the process to increase the speed of the drying process by allowing the moisture to separate from the fuel more efficiently. In tests, Fuel Right, TMA885783, 15 k or 30 k commercially available concentration levels of amine solution provided by Fuel Right (Canada) Limited, were added during the process to produce increased water removing results. The addition of Fuel Bright allows cloudy fuel samples to be dehydrated faster.

In a further embodiment of the present disclosure, an isolation valve 24 may be added to any or all ports in the dehydration system. The isolation valve 24 may provide a means to seal the ports, control the inflow and outflow of fluid, and connect external equipment to the system.

In a further embodiment of the present disclosure, a fuel level sensor (and alarm or readout) may be threaded into the chamber 8 at a desired "maximum expanded fluid level" (or multiple levels) to allow the operator to determine when the expanded and "boiling" amount of fuel in the chamber 8 is too great and at risk of flooding the vacuum intake port 11 to the condensing vessel 23 (if used) or to the vacuum pump 14 itself. This sensor may also be hooked up to a switch to allow for automatic shutdown of the vacuum pump 14 to mitigate against accidental filling of the vacuum intake port 11 (to the pump 14 from the chamber 8), thus ending or reducing the boiling of the fuel and reducing the volume of said fuel down from overfill levels.

In a further embodiment of the present disclosure, an electronically activated solenoid controlled valve may be employed in the top vapour space portion of the separator vessel 9 to allow a specific, metered ingress of ambient or dried air to be injected in to the vapour space above the fuel and done between specific programmable vacuum levels to increase the vapour removal of the gas state moisture from the vapour space toward the condensing vessel 23 and to keep the desirable high (29 inHg) vacuum pressure from dropping too greatly with a manual opening of isolation, ball or gate valves intended to "flush" the vapour space of humid moist air.

Figure 4:
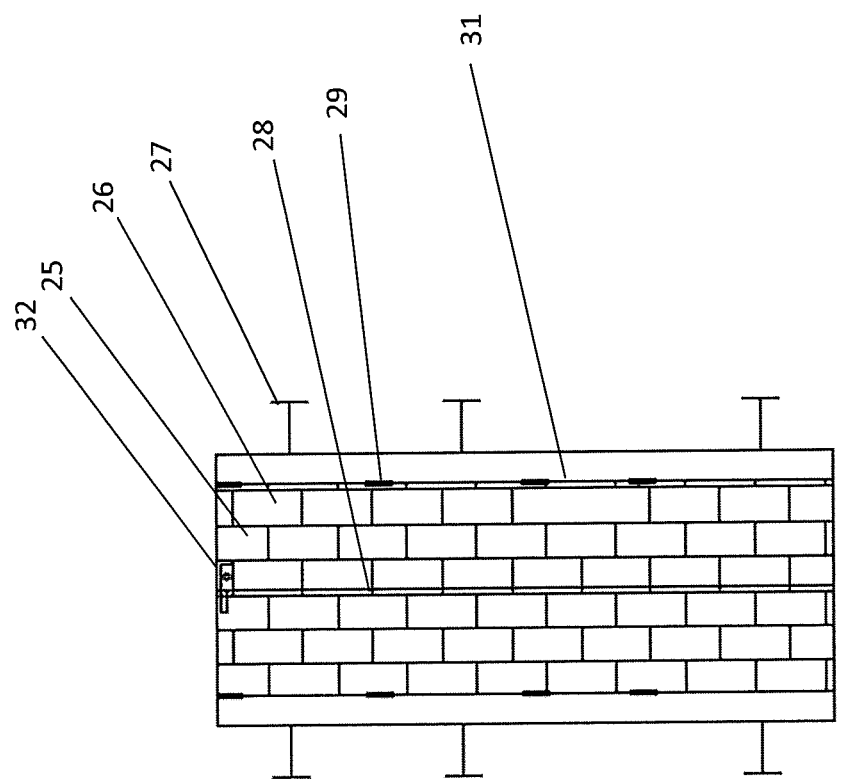
FIG. 4 is a top view of an embodiment of the fuel dehydration system in a vacuum truck.
Figure 5:
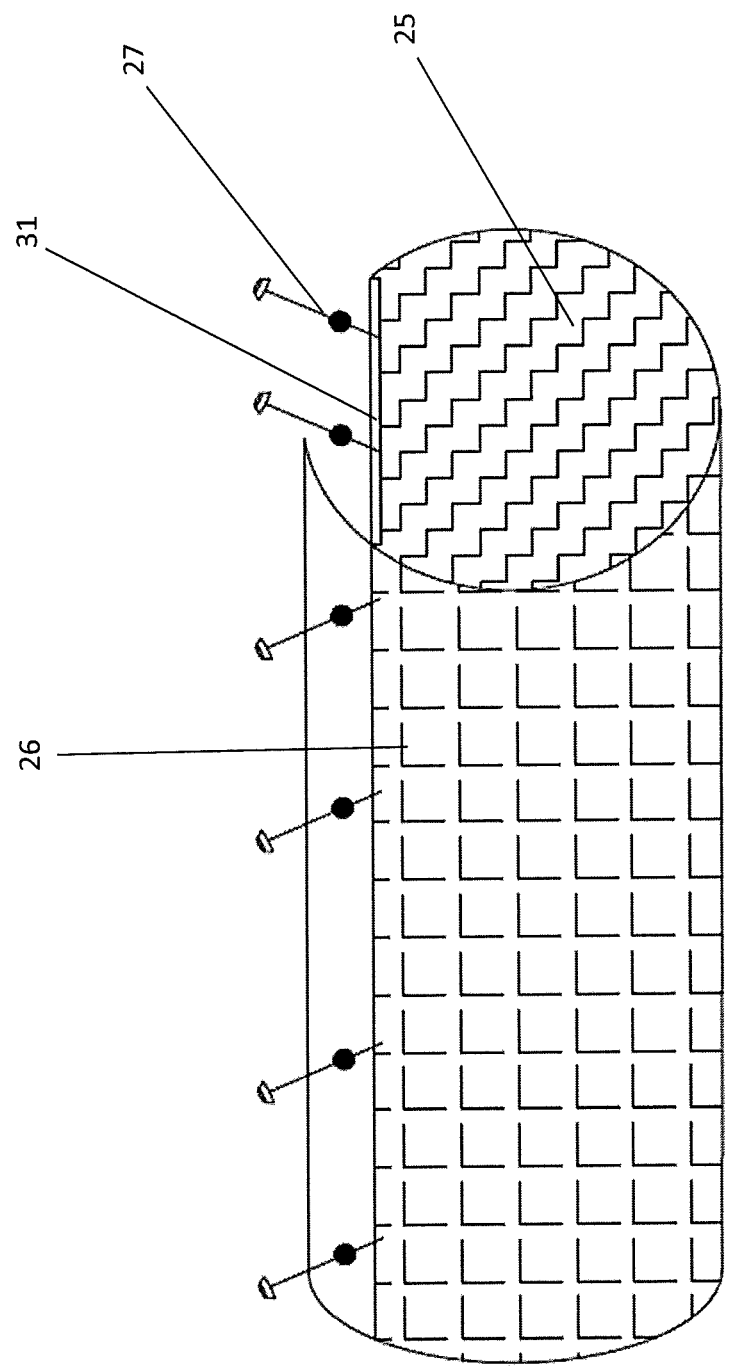
FIG. 5 is a side view of an embodiment of the fuel dehydration system in a vacuum truck.
Figure 6:
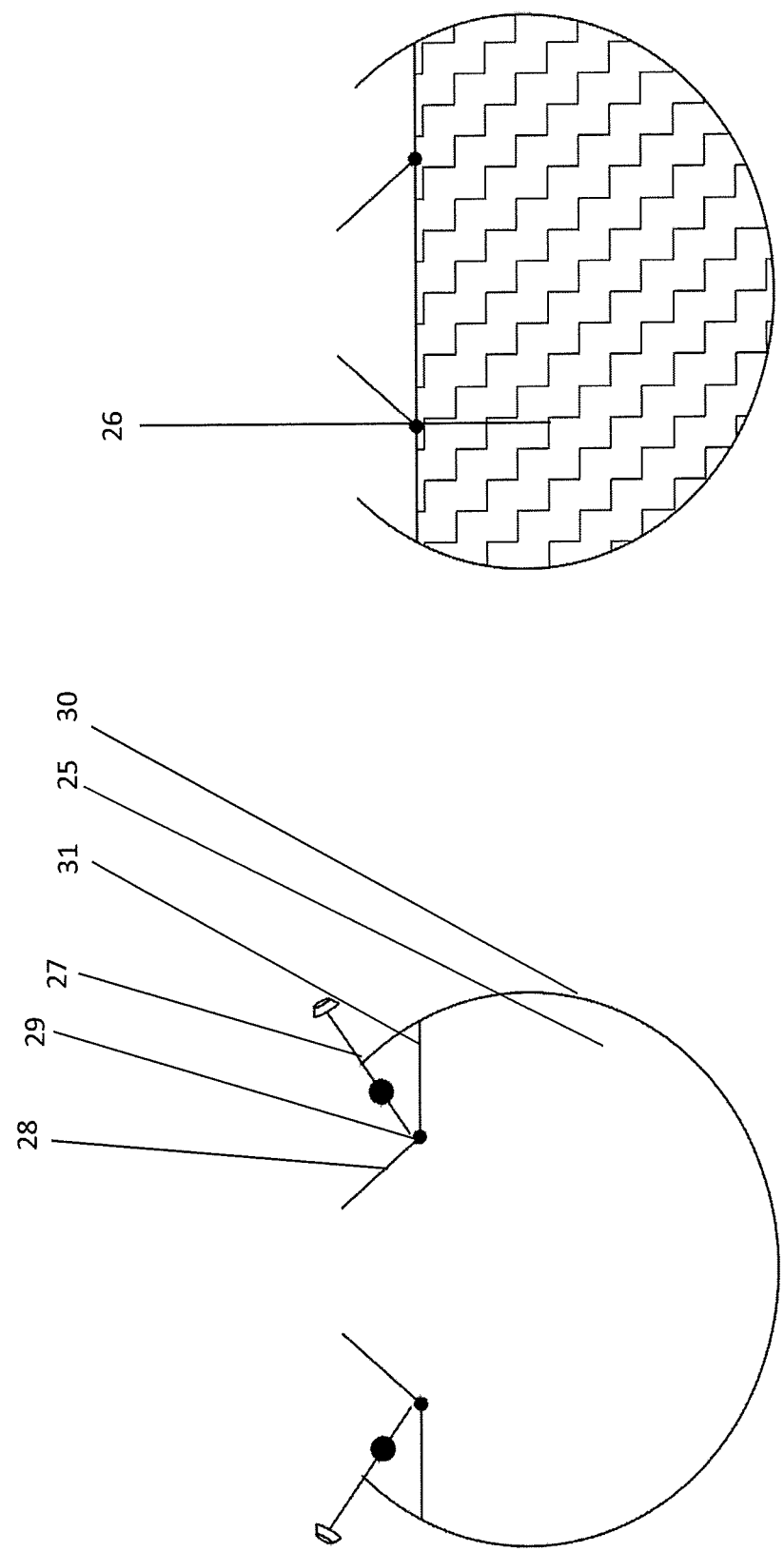
FIG. 6 is an end view of an embodiment of the fuel dehydration system in a vacuum truck.

The process described above may be scalable. The efficacy of the process may be maintained as it is scaled and a 1:1 ratio is maintained. More specifically, as the separator vessel 9 is increased in size, so too are the vacuum chamber 8 and the amount of foam media 17 used. Therefore, in a further embodiment of the present disclosure, as can be seen in FIG. 4, the process may be utilized within the tank of a straight vacuum truck 30. In such an embodiment, the rear of a vacuum truck is used as a separator vessel and the tank of the vacuum truck 25 is used as a vacuum rated chamber. The foam media 17 may be contained at or near the truck tank's floor to keep it from floating upward with the fuel as the fuel becomes dehydrated and interfering with the overfill protection valves or floats inside the vacuum truck tank 25.

In a preferred embodiment of the present disclosure, the foam media 17 may be contained within a lightweight, hydrocarbon resistant casing that would allow the fluid to move freely through the foam media. Possible materials that may be used for the casing include light gauge aluminium, carbon fiber, plastics, or polymers that could be built into a lattice, mesh, "open cell frame", or cage for the foam media 17.

Figure 7:
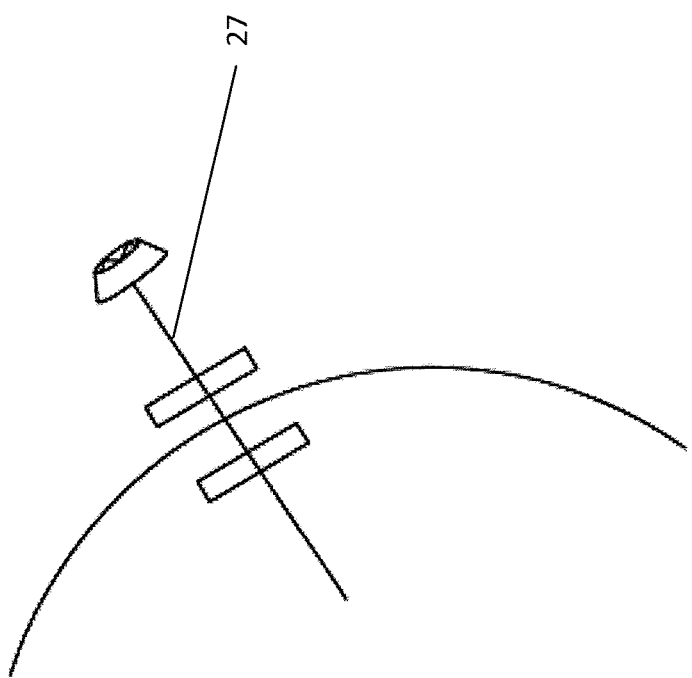
FIG. 7 is a exploded view of a housing anchor from an embodiment of the fuel dehydration system in a vacuum truck.

Referring still to FIG. 4, in an embodiment of the disclosure, the casing may act as a removable housing frame 26 that may be affixed to a wall of the vacuum truck tank 25. The housing frame 26 may have a number of extendable compression type anchors 27 or feet along its outer edge to extend and "foot" the housing 26 to the vacuum truck tank's 25 sides and keep it stable during the dehydration process. These anchors 27 or feet may be fixed to a sturdy or robust section at the top or sides of the housing frame 26 and screw out and/or extend and lever-lock into place so as to create an oppositional force against the tank walls, keeping the housing frame 26 from moving to a degree that would allow "bubbling" or rapid fluid movement to dislodge the housing frame 26 from its "locked-in" or "anchored" position. In a preferred embodiment of the present disclosure, the anchor 27 of the housing frame 26 may be composed of a lockable threaded rod that anchors to the wall of the interior vacuum truck tank 25. The threaded rod may use two nuts and a BUNA material pad, as can be seen in FIG. 7, to lock into place and limit the movement of the housing frame 26.

Figure 8:
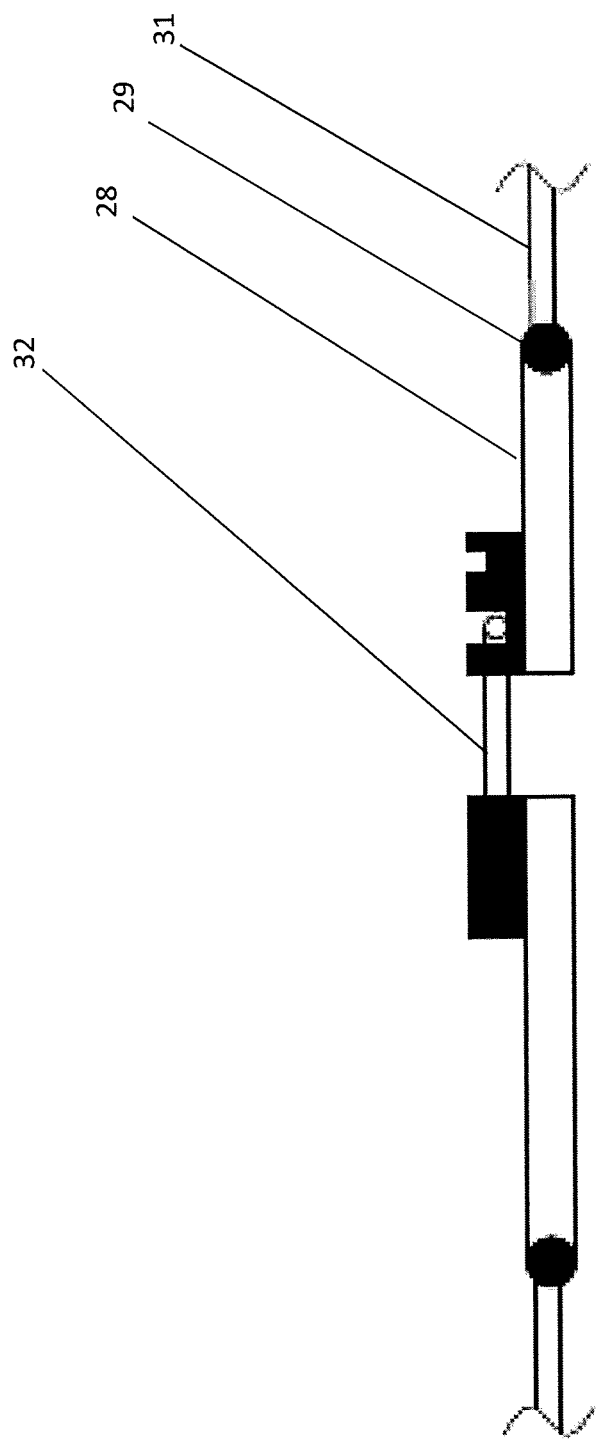
FIG. 8 is a side view of a hinged lid from an embodiment of the fuel dehydration system in a vacuum truck.

In a preferred embodiment of the present disclosure, the vacuum truck tank 25 may be closed using a hinged lid 28. The hinged lid 28 may allow for easier packing of foam media 17 into the vacuum truck tank. In one embodiment of the present disclosure, plates 31 may be fixed in place on the interior of the truck tank 25. The hinges 29 may be welded or epoxied on the top of plates 31 and the lid 28 could be hinged on the hinges 29. In a further embodiment of the disclosure, a barrel bolt 32 may be added on the lid 28, as can be seen in FIG. 8, to lock the lid 28 in place.

In another embodiment of the disclosure, the casing may include hydrocarbon and water resistant wheels on the bottom of the housing frame 26 to enable rolling of the casing into the vacuum truck tank 25.

Example

The following example tests of the system and method were intended to demonstrate an embodiment of the disclosure.

Fuel Samples

The tests were conducted using the fuel samples described in Table 1.

TABLE 1

| Test # | Sample date | Sample temperature | Sample quantity | Starting moisture content | Starting appearance | ISO particulate |
|---|---|---|---|---|---|---|
| 1 | 28 Aug. 2018 | 25° C. | 32 oz | ≥257 ppm | Opaque | 27.6/22.0/16.1 |
| 2 | 28 Aug. 2018 | 25° C. | 32 oz | ≥257 ppm | Opaque | 26.8/21.4/15.4 |
| 3 | 6 Sep. 2018 | 27° C. | 32 oz | ≥257 ppm | Milky/opaque | 22.7/19.9/14.1 |

The fuel samples had high moisture levels and were opaque or milky/opaque instead of "clear and bright". The fuel in its original state would not pass the ASTM D4176 test or adhere to the Worldwide Fuel Charter as moisture and particulate was present, and the fuel would need to be "dried" before the it could be used.

The apparatus used to measure the moisture content of the fuel had a maximum reading of 257 ppm. The starting moisture content of the fuel samples was measured to be greater than 257 ppm; however, it should be understood that the starting moisture content of the samples was much higher than 257 ppm as indicated by the starting appearance of the fuel samples. Test 1 and Test 2 samples originally appeared opaque with moisture suspended throughout the fuel. Test 3 fuel sample appeared cloudier than the other samples, suggesting that its starting moisture content was significantly greater. The Test 3 sample also had sitting water at the bottom of its containment beaker, which is known to be a major issue in the fuel industry as it is difficult to remove from fuel.

The temperature of each fuel sample was its ambient temperature, or close thereto.

Experimental Details

The following method for removing moisture from fuels was used:
1. An open-cell reticulated foam medium was placed within an Erlenmeyer flask capable of withstanding a vacuum.
2. A fuel sample was introduced into the flask, submerging the reticulated foam medium.
3. The top of the flask was sealed by a vacuum line, and a vacuum was produced in the flask.
4. The vacuum was maintained for a period of time, as noted in the table, causing the moisture within the fuel to boil-off.
5. The vacuum line was shut off and the fuel was released from the vacuum.
6. The fuel was then transported by hose into a beaker.

The tests were conducted under the conditions listed in Table 2.

TABLE 2

| Test number | Vacuum | Time | Foam density |
|---|---|---|---|
| 1 | 27 inHg | 15 minutes | Low |
| 2 | 27 inHg | 60 minutes | High (3xLow) |
| 3 | 27 inHg | 5 hours | High (3xLow) |

The application of a vacuum and the foam media allowed moisture trapped in the fuel to "boil off". The vacuum was maintained to allow for continued removal of moisture in the fuel. The rate of removal of moisture decreases, as the fuel reaches lower moisture levels, until the fuel is still and the dehydration process is complete. Higher foam density provides a greater surface lattice for water molecules in the fuel to collect on, which results in faster dehydration of the fuel.

Results

The outcome of the tests is provided in Table 3.

TABLE 3

| Test number | Final moisture content | Final appearance |
|---|---|---|
| 1 | 161 ppm | Slight cloudiness |
| 2 | 63 ppm | Clear |
| 3 | 128 ppm | Clear |

The results show a significant reduction of moisture content in each of the test fuel samples, with each fuel reaching moisture levels under the industry required 200 ppm. The tests helped clear the fuel samples of moisture and brought the fuel in-line with industry standards.

Test 1 was able to bring a fuel sample that had high levels of moisture to under 200 ppm in only 15 minutes of vacuum time and using relatively lower density foam, demonstrating that industry standards can be quickly met using a simple model of the dehydration system and method. Test 2 and 3 employed relatively higher density foams and were held under vacuum longer than Test 1, which resulted in Test 2 and 3 producing relatively clearer fuel with lower moisture levels. It should be noted here that Test 3 had, based on a visual inspection, a significantly higher moisture content that the other tested fuels, and significantly higher than the 257 ppm reading. The Test 3 sample also had, as mentioned above, associated standing water. The Test 3 resultant moisture content of 128 ppm was below the industry requirement.

The Test 3 fuel sample was held under vacuum for 5 hours to provide sufficient time to extract the moisture and the sitting water. At the end of Test 3, the fuel sample was clear and had a moisture level of below 200 ppm, which would pass the ASTM D4176 test and adhere to the Worldwide Fuel Charter.

Various embodiments of the present disclosure having been described in detail by way of example; however, it will be apparent to those skilled in the art that variations and modifications may be made without departing from the disclosure. The disclosure includes all such variations and modifications that fall within the scope of the claims.

The invention claimed is:

1. A dehydration system for removing moisture from a fluid, comprising:
 a separator vessel, comprising:
  a body;
  a vacuum-rated chamber located within the body;
  a sealable vacuum intake port on the body, wherein the sealable vacuum intake port connects the body to the vacuum-rated chamber;
  a sealable fluid intake port on the body, wherein the fluid intake port connects the body to the vacuum-rated chamber; and
  an open-cell reticulated foam medium, wherein the open-cell reticulated foam medium is disposed within the vacuum-rated chamber;
 a vacuum pump connected to the sealable vacuum intake port by way of a vacuum-rated conduit; and
 a vacuum-rated condensing vessel capable of collecting moisture disposed in the vacuum-rated conduit connecting the vacuum pump and the vacuum-rated chamber.

2. The dehydration system of claim 1, further comprising a vacuum gauge connected to the vacuum-rated chamber to maintain a pressure between 26 inHg and 30 inHg in the vacuum-rated chamber.

3. The dehydration system of claim 1, further comprising a vacuum gauge connected to the vacuum-rated chamber to maintain a pressure between 29 inHg and 30 inHg in the vacuum-rated chamber.

4. The dehydration system of claim 1, further comprising a vacuum gauge connected to the vacuum-rated chamber to maintain a pressure between 29.92 inHg and 30 inHg the vacuum-rated chamber.

5. The dehydration system of claim 1, further comprising:
 a retaining mechanism affixed to the inner wall of the vacuum-rated chamber for retaining the open-cell reticulated foam medium and preventing the open-cell reticulated foam medium from migrating up the vacuum-rated chamber.

6. The dehydration system of claim 1, further comprising:
 at least one filter attached to the fluid intake port on the body to clear an intake fluid of particulate matter.

7. The dehydration system of claim 1, further comprising a cooling device to cool the vacuum-rated condensing vessel to increase a moisture condensing efficacy of the vacuum-rated condensing vessel.

8. The dehydration system of claim 1, wherein the separator vessel further comprises:
 a removable and sealable lid comprising, in part, a vacuum-rated clear material, the clear material providing operator sightlines through the lid and inside the vacuum-rated chamber.

9. A method of removing moisture from a fuel, comprising:
 providing the fuel to a vacuum-rated chamber containing a reticulated foam medium within the vacuum-rated chamber;
 sealing the vacuum-rated chamber;
 engaging a vacuum pump to produce a vacuum in the vacuum-rated chamber thereby causing moisture in the fuel to boil under pressure, wherein the vacuum pump is engaged to create a vacuum between 26 inHg and 30 inHg in the vacuum-rated chamber;
 removing vaporized moisture from the vacuum-rated chamber until the fuel reaches a required level of dehydration; and
 removing the fuel from the vacuum-rated chamber.

10. The method of claim 9, wherein the vacuum pump is engaged to create a vacuum of between 29 inHg and 30 inHg in the vacuum-rated chamber.

11. The method of claim 9, wherein the vacuum pump is engaged to create a vacuum between 29.92 inHg and 30 inHg in the vacuum-rated chamber.

12. The method of claim 9, wherein an amine solution is added to the fuel prior to engaging the vacuum pump.

13. The method of claim 9, wherein the required level of dehydration is below 150 ppm of water.

14. The method of claim 9, wherein the required level of dehydration is below 100 ppm of water.

15. The method of claim 9, wherein the required level of dehydration is below 50 ppm of water.

* * * * *